United States Patent
Ouboter et al.

(10) Patent No.: US 9,783,253 B2
(45) Date of Patent: Oct. 10, 2017

(54) SEAT DEVICE FOR A SCOOTER

(71) Applicant: Micro Mobility Systems AG, Kuesnacht (CH)

(72) Inventors: Janine Ouboter, Uetikon am See (CH); Willem Jan Ouboter, Uetikon am See (CH)

(73) Assignee: MICRO MOBILITY SYSTEMS AG, Kuesnacht (CH)

( * ) Notice: Subject to any disclaimer, the term of this patent is extended or adjusted under 35 U.S.C. 154(b) by 0 days.

(21) Appl. No.: 14/782,473

(22) PCT Filed: Apr. 3, 2014

(86) PCT No.: PCT/EP2014/056713
§ 371 (c)(1),
(2) Date: Oct. 5, 2015

(87) PCT Pub. No.: WO2014/166812
PCT Pub. Date: Oct. 16, 2014

(65) Prior Publication Data
US 2016/0068213 A1    Mar. 10, 2016

(30) Foreign Application Priority Data

Apr. 8, 2013 (DE) .......................... 10 2013 103 482
Jun. 25, 2013 (DE) .......................... 10 2013 106 634

(51) Int. Cl.
*B62K 13/00* (2006.01)
*B62J 1/08* (2006.01)
(Continued)

(52) U.S. Cl.
CPC ................. *B62J 1/08* (2013.01); *B62K 3/002* (2013.01); *B62K 9/02* (2013.01); *B62K 13/00* (2013.01);
(Continued)

(58) Field of Classification Search
None
See application file for complete search history.

(56) References Cited

U.S. PATENT DOCUMENTS 1,253,768 A    1/1918    Aman
5,746,481 A *   5/1998    Obermaier ............. A47C 9/002
                                                                                    297/452.41
(Continued)

FOREIGN PATENT DOCUMENTS

AT           507556 BI      6/2010
AU      2014253340 A1    10/2015
(Continued)

OTHER PUBLICATIONS

The above references were cited in an Feb. 25, 2014 German Search Report a which is enclosed with a partial English Translation, that issued in German Patent Application No. DE 10 2013 106 634.8
(Continued)

*Primary Examiner* — John Walters
*Assistant Examiner* — Hilary L Johns
(74) *Attorney, Agent, or Firm* — Cowan, Liebowitz & Latman, P.C.; Mark Montague

(57) ABSTRACT

A scooter seat device, in particular, a kick scooter seat device, with a seat base body and with at least one first fastening unit for fastening to a scooter. The first fastening unit comprises at least one support surface, which in a mounted state is provided to support the seat base body at least against a footboard of the scooter.

11 Claims, 11 Drawing Sheets

Figure 1:
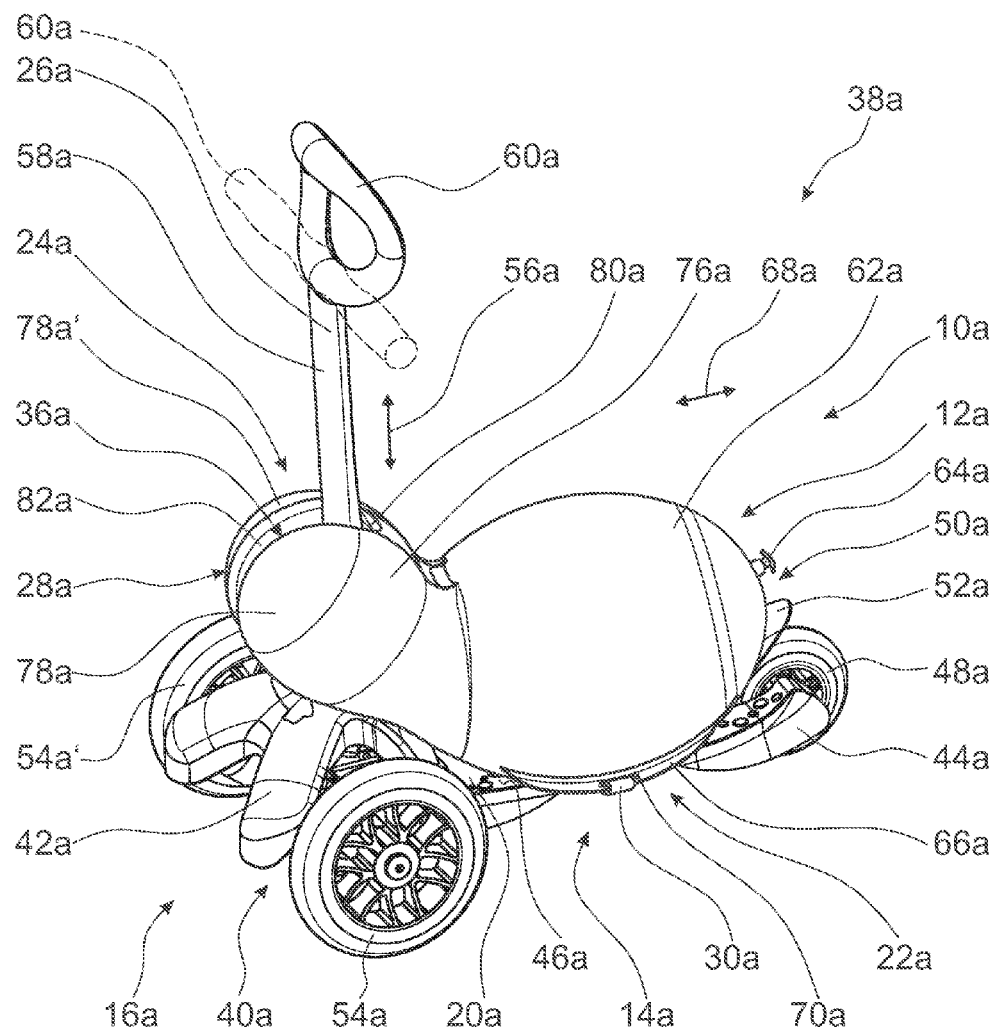

(51) Int. Cl.
*B62K 9/02* (2006.01)
*B62K 15/00* (2006.01)
*B62K 3/00* (2006.01)
*F16B 1/00* (2006.01)

(52) U.S. Cl.
CPC ............... *B62K 15/00* (2013.01); *F16B 1/00* (2013.01); *F16B 2001/0028* (2013.01)

(56) References Cited

U.S. PATENT DOCUMENTS

| | | | |
|---|---|---|---|
| 6,139,031 A * | 10/2000 | Wingard | A63C 5/03 280/14.28 |
| 2001/0040352 A1 | 11/2001 | Wang et al. | |
| 2002/0000702 A1 | 1/2002 | Charron | |
| 2002/0121757 A1 * | 9/2002 | Louh | B62K 3/002 280/87.041 |
| 2010/0013183 A1 | 1/2010 | He | |
| 2015/0225034 A1 | 8/2015 | Ouboter | |

FOREIGN PATENT DOCUMENTS

| | | |
|---|---|---|
| CA | 2908649 A1 | 10/2014 |
| CN | 201880338 A | 6/2011 |
| DE | 20117142 U1 | 3/2002 |
| DE | 10109376 A1 | 9/2002 |
| DE | 20209498 U1 | 11/2002 |
| DE | 20213238 U1 | 7/2003 |
| DE | 20306854 U1 | 8/2003 |
| DE | 20316610 U1 | 4/2004 |
| DE | 20319192 U1 | 4/2004 |
| DE | 102008038339 A1 | 2/2010 |
| DE | 202011001596 U1 | 5/2011 |
| WO | 2005073065 A1 | 8/2005 |

OTHER PUBLICATIONS

The above references were cited in an International Search Report for Appl. No. PCT/EP2014/056713; dated Oct. 22, 2015.

The above reference was cited in a Dec. 15, 2016 European Office Action, which is enclosed with an English Translation, that issued in European Patent Application No. 14 716 270.5.

* cited by examiner

SEAT DEVICE FOR A SCOOTER

CROSS REFERENCE TO RELATED APPLICATIONS

This is a U.S. national stage of application No. PCT/EP2014/056713, filed on Apr. 3, 2014. Priority under 35 U.S.C.§119(a) and 35 U.S.C.§365(b) is claimed from German Patent Application No. DE 10 2013 103 482.9, filed on Apr. 8, 2013, and German Patent Application No. DE 10 2013 106 634.8, filed on Jun. 25, 2013.

STATE OF THE ART

The invention relates to a scooter seat device.

A scooter seat device, in particular a kick scooter seat device, with a seat base body and with at least one first fastening unit for releasable fastening to a scooter, has already been proposed.

The objective of the invention is, in particular, to provide a generic device with improved characteristics regarding an assembly-friendliness, regarding a construction, regarding an operator's comfort and/or in particular regarding a child-friendliness. The objective is achieved according to the invention by the features of patent claim 1, while advantageous implementations and further developments of the invention may be obtained from the dependent claims.

Advantages of the Invention

The invention is based on a scooter seat device, in particular on a kick scooter seat device, with a seat base body and with at least one first fastening unit for fastening to a scooter.

It is proposed that the at least one first fastening unit comprises at least one support surface which is in a mounted state provided to support the seat base body at least against a footboard of a scooter. Preferably in particular a main weight force of the scooter seat device and/or of an operator is supported against the footboard of the scooter via the support surface in a mounted state and/or in operation. Preferentially the scooter seat device is implemented by a children's kick scooter seat device. Particularly preferentially the at least one first fastening unit is provided in particular for a releasable fastening to a scooter. Principally the scooter seat device can also be fixedly connected to the scooter by the at least one first fastening unit. The scooter seat device may, for example, be integrated in the footboard of the scooter. In particular, in this it would be conceivable that a deck of the footboard can be removed or folded away and the scooter seat device is then unfolded, pumped up and/or assembled for operation. After operation the scooter seat device can then be re-stowed in the footboard. A "scooter seat device" is to be understood, in this context, in particular as a device which comprises at least one seat surface and is provided to be used on a scooter. Preferably it is to be understood, in particular, as a device implementing a seat for a scooter. Moreover, in this context, a "kick scooter seat device" is to be understood, in particular, as a scooter seat device that is provided to be used on a kick scooter. By a "kick scooter" is herein to be understood, in particular, a non-motorized means for moving along with at least two rolls respectively wheels. Preferably it is to be understood, in particular, as a scooter which is at least partially driven by an operator's muscle force via kicking with at least one leg. Furthermore, in this context, a "seat base body" is to be understood, in particular, as a part of a seat device comprising a seat surface respectively implementing a seat surface. Preferentially it is to be understood as a body implementing at least a large portion of a volume of the seat device. Herein "at least a large portion" is to mean, in particular, at least 50%, preferably at least 60% and particularly preferably at least 70% of a total. By a "fastening unit" is to be understood, in this context, in particular a unit that is provided to fasten the scooter seat device to at least one further device and/or further apparatus. Preferably it is to be understood, in particular, as a unit provided to connect the scooter seat device to at least one further device and/or further apparatus by a positive-fit and/or a negative-fit connection. "Connected by a positive-fit and/or a negative-fit connection" is herein to mean, in particular, a releasable connection, wherein a holding force between two structural components is transmitted preferably by geometrical engagement of the structural components into each other and/or by a friction force between the structural components. Furthermore, "releasable" is intended, in this context, in particular to mean "separable in a non-destructive manner". Moreover a "support surface" is to be understood, in this context, in particular as a surface of a device, which is provided to be adjacent on respectively at a further surface of a further object. Preferentially it is to be understood, in particular, as a surface by which a device lies upon a further surface in at least one state, or upon which lies a further object in at least one state. Preferentially it is to be understood, in particular, as a support surface. Especially preferentially it is to be understood, in particular, as a surface via which a main weight force is supported. By a "main weight force" is to be understood, in this context, in particular at least 30%, preferably at least 50% and particularly preferably at least 70% of a total weight force. A "mounted state" is to be understood, in this context, in particular as a state in which the scooter seat device is completely connected to the scooter in the intended way. Preferably it is to be understood, in particular, as a state for an operation. Furthermore, in this context, "provided" is to mean, in particular, specifically designed and/or equipped. By an object being provided for a certain function is to be understood, in particular, that the object implements and/or carries out said certain function in at least one application state and/or operating state. Further, in this context, a "footboard" is to be understood, in particular, as a part of the scooter which is in at least one operating state intended to provide a surface where to put at least one foot of an operator. Preferentially it is to be understood, in particular, as a part of the scooter which comprises at least one main extension surface extending, in a regular stand of the scooter, at least approximately parallel to a ground plane. Herein a "main extension plane" of a part is to mean, in particular, a plane which is parallel to a largest lateral surface of a smallest geometrical rectangular cuboid just still completely encompassing the part and which in particular extends through the center of the rectangular cuboid.

By the implementation of the scooter seat device according to the invention, an especially advantageous seat device can be made available. In particular, a particularly easy mounting on a scooter is achievable due to the support surface. Moreover, due to this, in particular, only a low degree of stiffness of the seat device is required, as the seat base body is directly supported on the footboard. In particular in an embodiment as a children's kick scooter seat device, this allows an advantageous simple and reliable seat device for children to be made available. Moreover this allows, in particular, keeping a weight low.

It is further proposed that the at least one first fastening unit comprises at least one receiving element which is, in a mounted state, provided to at least partially engage around the footboard of the scooter. By a "receiving element" is to be understood, in this context, in particular an element comprising at least one receiving region for at least partially receiving an object. Preferably it is to be understood as an element provided to at least partially engage around an object. Furthermore, in this context, "at least partially engage" is to mean, in particular, that an object that is engaged around is encompassed by the receiving element in at least one plane in an angle range of at least 90°, preferably of no less than 120° and particularly preferably at least 180°. Thereby an advantageous hold of the scooter seat device on the scooter can be ensured. This further allows, in particular, making available a structurally simple and easily manufacturable fastening of the scooter seat device on the scooter. Moreover, a particularly cost-favorable scooter seat device can thus be provided.

It is also proposed that the scooter seat device comprises at least one second fastening unit, which is releasably connectable to a steering rod of the scooter. A "steering rod" is to mean, in this context, in particular a rod-shaped structural component comprising at least one handle element for an operator. Preferably the steering rod is provided for a force transmission from a handle element onto at least one wheel and/or at least one axle of the scooter. Particularly preferably the steering rod is provided at least partially for a transmission of a steering movement of an operator onto at least one wheel and/or at least one axle of the scooter. Herein the steering rod may be arranged rigidly as well as movably with respect to the footboard of the scooter. Thereby an especially advantageous hold of the scooter seat device on the scooter can be ensured. In particular, in this way a fastening at two points of the scooter can be realized, thus preventing an inadvertent release.

It is also proposed that the at least one second fastening unit comprises at least one receiving element which in a mounted state is provided to at least partially engage around the steering rod of the scooter. As a result of this, a constructively simple and easily manufacturable fastening of the scooter seat device at the steering rod of the scooter can advantageously be rendered available. In particular, a positive-fit connection can thus already be rendered available in several directions, without special mounting procedures being required to be carried out.

Furthermore it is proposed that the at least one second fastening unit comprises at least one receiving element which, in a mounted state, is provided to completely engage around the steering rod of the scooter. By "completely engage around" is to be understood, in this context, in particular that an object, in particular the steering rod of the scooter, that is engaged around is completely encompassed by the receiving element in at least one plane. As a result of this, a constructively simple, particularly reliable fastening of the scooter seat device at the steering rod of the scooter can advantageously be rendered available. In particular, this allows achieving an especially advantageous positive fit, in which in particular an easy release of the scooter seat device from the scooter can be avoided.

It is moreover proposed that the receiving element of the at least one second fastening unit comprises a pass-through opening, which in at least one plane has a contiguous, uninterrupted outer contour. A "pass-through opening" is to be understood, in this context, in particular as an opening comprising at least an inlet as well as an outlet that is separate from the outlet. Preferably the outlet is arranged at an end of the pass-through opening that faces away from the inlet. By a "contiguous, uninterrupted outer contour" is to be understood, in this context, in particular that an element delimiting the pass-through opening has in at least one plane, which in particular completely intersects the pass-through opening, an outer contour that faces the pass-through opening and encompasses the pass-through opening in a materially bonded, uninterrupted manner. As a result of this, a particularly reliable and stable fastening of the scooter seat device at the steering rod of the scooter can advantageously be rendered available. In particular, this allows achieving a particularly advantageous positive-fit, in which in particular an easy release of the scooter seat device from the scooter is avoidable.

Further it is proposed that the at least one first fastening unit comprises at least one fastening means, which is in a mounted state provided to releasably fixate the footboard of the scooter in a receiving region of the at least one receiving element. A "fastening means" is to be understood, in this context, in particular as a means of the fastening unit that is provided to ensure a fastening of the scooter seat device to at least one further device and/or a further apparatus via the fastening unit. Preferentially it is to be understood, in particular, as a means which is provided for a direct positive-fit and/or negative-fit fixation of the scooter seat device to at least one further device and/or further apparatus. A variety of fastening means is conceivable, which are deemed expedient by the person having ordinary skill in the art, e.g. hook-and-loop fasteners, rubber tapes, magnets, adhesive tapes, buckles and/or zips. Thus a fastening means can be rendered available in addition to the receiving element, which securely fixates the scooter seat device. Furthermore, particularly advantageously, a fastening unit may thus be provided by which an especially captive connection between the scooter seat device and the scooter is possible.

It is also proposed that the at least one fastening means is at least partially implemented by a hook-and-loop fastener and/or a rubber tape. By a "hook-and-loop fastener" is to be understood, in this context, in particular an adherent closure consisting of at least two parts. Preferably the closure consists of two strips and/or surfaces, one strip and/or surface having a coating of a plurality of little barbed hooks and the other strip and/or surface having a fluffy layer. In an established connection the barbed hooks get hooked in the fluffy layer, thus establishing a negative-fit and/or positive-fit connection. As an alternative, however, other hook-and-loop variants are also possible, e.g. a mushroom-tape-and-suede-tape connection, a mushroom-tape-and-fleece-tape connection and/or a mushroom-tape-and-mushroom-tape connection. A "rubber tape" is to be understood, in this context, in particular as an elastic tape. Preferably it is to be understood, in particular, as a tape that is at least partially made of caoutchouc. The caoutchouc may herein be natural as well as artificial caoutchouc. "Elastic" is herein to mean, in particular, that an element is repeatedly deformable without the element being mechanically damaged or destroyed and which, in particular, following deformation tends to return to an original shape of its own accord. Thus a fastening unit with an especially advantageous fastening means may be rendered available in an especially advantageous fashion. Furthermore this allows, in particular, making a fastening means available by which a connection can be particularly easily established. Thus in particular a fastening means may be made available, by which a connection can be established even by a child without the parents' assistance, thus allowing a high degree of child-friendliness to be achieved. In particular, in case of the fastening means being implemented as a rubber tape, a fixation may be effected particularly easily. Moreover this allows, in particular, to provide a particularly cost-favorable scooter seat device with a particularly simple and cost-favorable fastening unit.

Furthermore it is proposed that the at least one second fastening unit comprises at least one fastening means, which is in a mounted state provided to releasably fixate the steering rod of the scooter in a receiving region of the at least one receiving element. As a result of this, a fastening unit can be especially advantageously provided by which an especially captive connection between the scooter seat device and the scooter is possible.

It is also proposed that the at least one fastening means is at least partially implemented by a hook-and-loop fastener. Thus a fastening unit with a particularly easily manufacturable fastening means can be rendered available in an especially advantageous fashion. Furthermore this allows to provide, in particular, a particularly simple and cost-favorable fastening means.

It is further proposed that the seat base body is embodied at least partially in a one-part implementation with the at least one first fastening unit. Preferably the seat base body is implemented completely in a one-part implementation with the at least one first fastening unit. Preferentially the seat base body and the at least one support surface of the at least one first fastening unit are manufactured of one piece. "In a one-part implementation" is to mean, in this context, in particular at least connected by material-bond, e.g. via a welding process, an adhesive process, an injection-molding process and/or another process that is deemed expedient by the person having ordinary skill in the art, and/or advantageously formed in one piece, e.g. by manufacturing of one cast and/or by manufacturing in a one-component or multi-component injection molding procedure and advantageously of one single blank. As a result of this, an advantageous scooter seat device can be rendered available. Moreover, in particular, individual parts can thus be avoided. Furthermore in a one-part implementation an advantageous easy mounting of the scooter seat device to the scooter is achievable.

Moreover it is proposed that the seat base body is embodied at least partially in a one-part implementation with the at least one second fastening unit. Preferably the seat base body is completely embodied in a one-part implementation with the at least one second fastening unit. Particularly preferably the seat base body and the at least one receiving element of the at least one second fastening unit are made of one piece. Particularly preferably the seat base body and the at least one receiving element of the at least one second fastening unit include a shared hollow space. As a result of this, an advantageous scooter seat device may be rendered available. Furthermore this allows, in particular, avoiding further individual parts. Moreover in a one-part implementation an advantageous easy mounting of the scooter seat device to the scooter is achievable.

It is also proposed that the at least one first fastening unit and the at least one second fastening unit can be connected to the scooter without tools and/or can be separated from the scooter without tools. "Without tools" is to mean, in this context, in particular without additional aids. Thus a connection may be established and released in a particularly easy fashion. In particular, due to this no tool is required for establishing and releasing the connection, as a result of which such a connection may be released and established anywhere. Furthermore the scooter seat device can in particular be mounted to a scooter and/or demounted without tools or special wrenches. A mounting can thus be effected, in particular, also by a child without the parents' assistance, which also allows achieving a high degree of child-friendliness.

Furthermore it is proposed that the seat base body is embodied at least partially by a gas-filled hollow body. By a "gas-filled hollow body" is to be understood, in this context, in particular a body comprising a solid and/or in particular an elastic exterior shell, which completely delimits an inner space enclosed in it. Preferably the inner space is at least to a large part filled with a gas and/or fillable with a gas. Preferably it is to be understood, in particular, as a body with a soft and/or elastic exterior shell, the exterior shell of the hollow body and the hollow body itself taking on a final shape due to the gas in the inner space. Herein "at least to a large part" is to mean, in particular by at least 70%, preferably by at least 80% and particularly preferably by at least 90%. Thus an advantageously light-weight scooter seat device can be provided. Moreover thus a gas can be released out of the seat base body, e.g. for transport, as a result of which the scooter seat device is particularly compact for transport purposes. For use the scooter seat device merely has to be pumped up again. Moreover a dynamic sitting sensation is achievable. In particular this allows, in particular when applied in a children's kick scooter, to improve a balance feeling and thus a development of children. As a result of this, a high degree of child-friendliness is also achievable. Moreover, a dampening of the seat base body is thus achievable in a structurally simple fashion. Furthermore, in particular, a particularly cost-favorable scooter seat device can thus be provided.

It is further proposed that the seat base body has a valve, via which air can be released out of a hollow space of the hollow body and/or can be added. By a "valve" is to be understood, in this context, in particular a structural element which is provided to control a flow-through of fluids, in particular of gases. A variety of structural valve types is conceivable while, preferably, this is to mean a blow-up valve, in particular a blow-up non-return valve, and/or a snap-in valve. Thereby a gas, in particular air, can be added to and/or removed from the seat base body according to requirements.

Furthermore it is proposed that the at least one second fastening unit is embodied at least partially by a gas-filled hollow body. Preferably the second fastening unit and the seat base body are embodied by a gas-filled hollow body in a one-part implementation. This allows to provide an advantageously light-weight scooter seat device. Moreover this allows, for example for transport purposes, a gas to be released out of the second fastening unit and preferably out of the seat base body as well, as a result of which the scooter seat device is especially compact for transport purposes. For use the scooter seat device merely has to be pumped up again.

DRAWINGS

Further advantages may be gathered from the following description of the drawings. In the drawings four exemplary embodiments of the invention are depicted. The drawings, the description and the claims contain a plurality of features in combination. The person having ordinary skill in the art will also purposefully consider the features separately and will find further expedient combinations.

Figure 2:
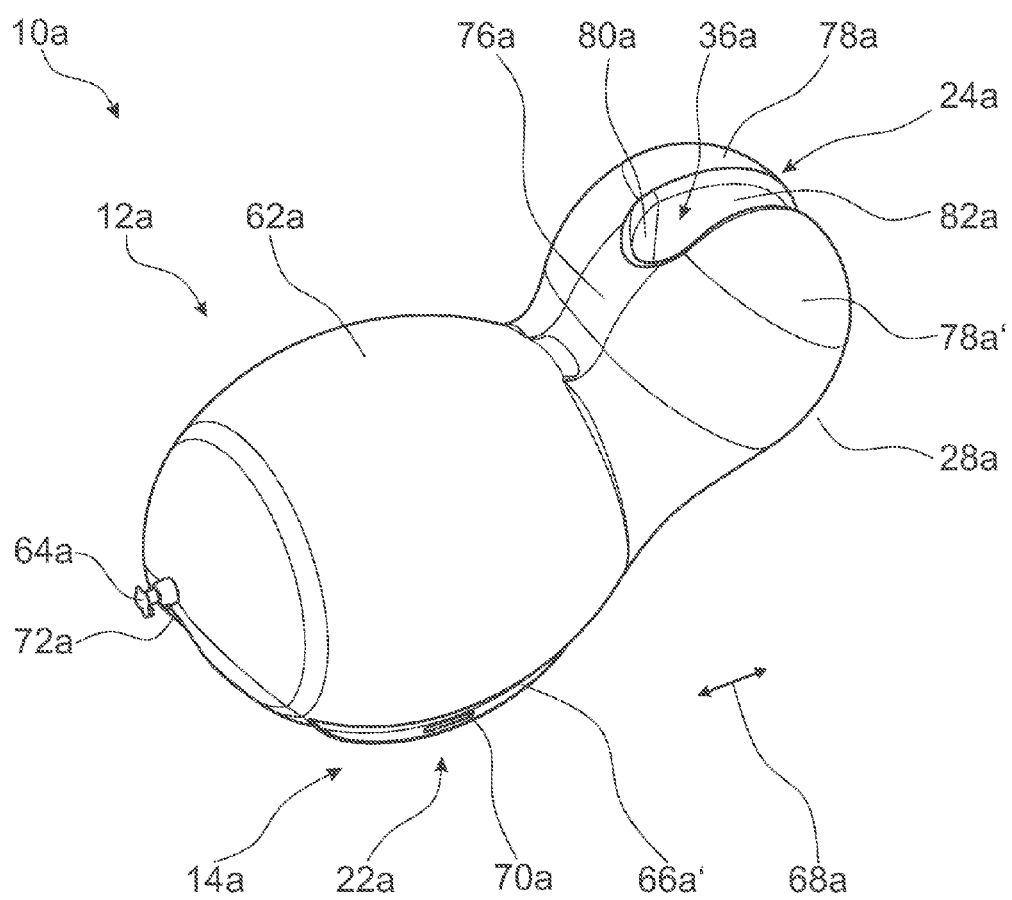
Figure 3:
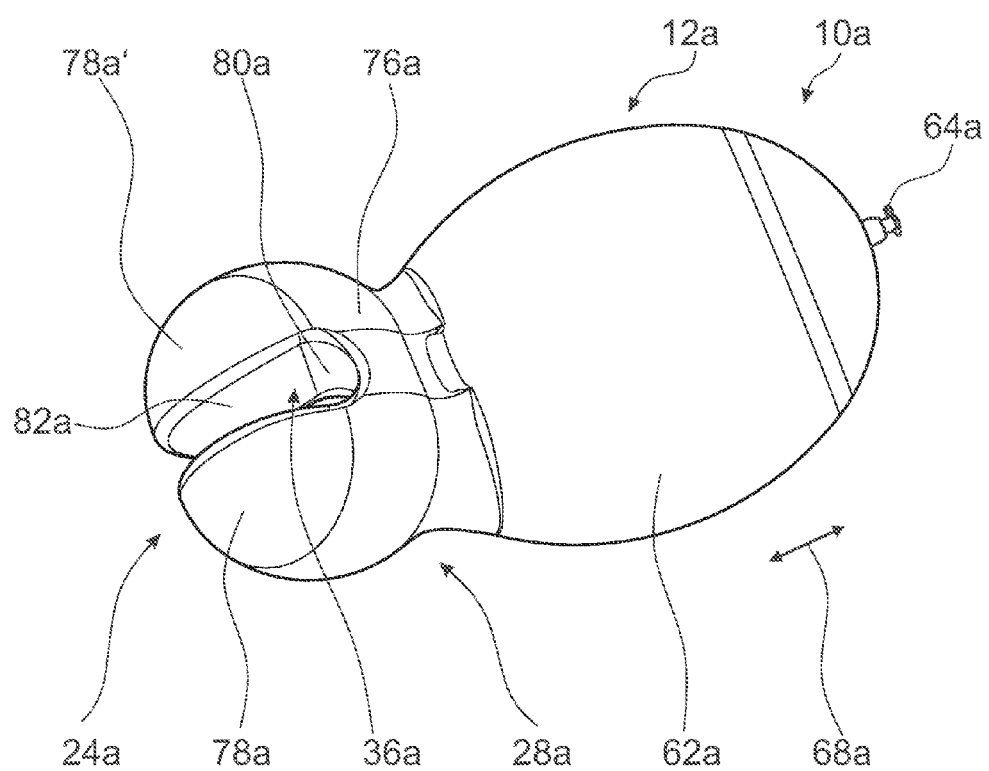
Figure 4:
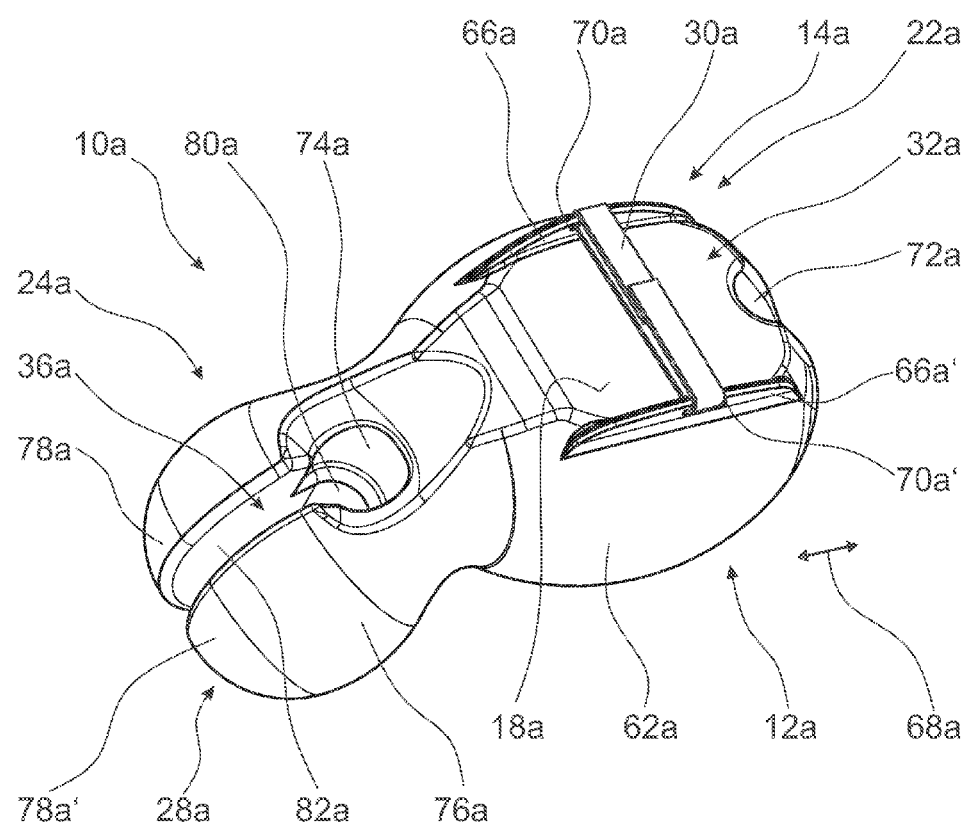
Figure 5:
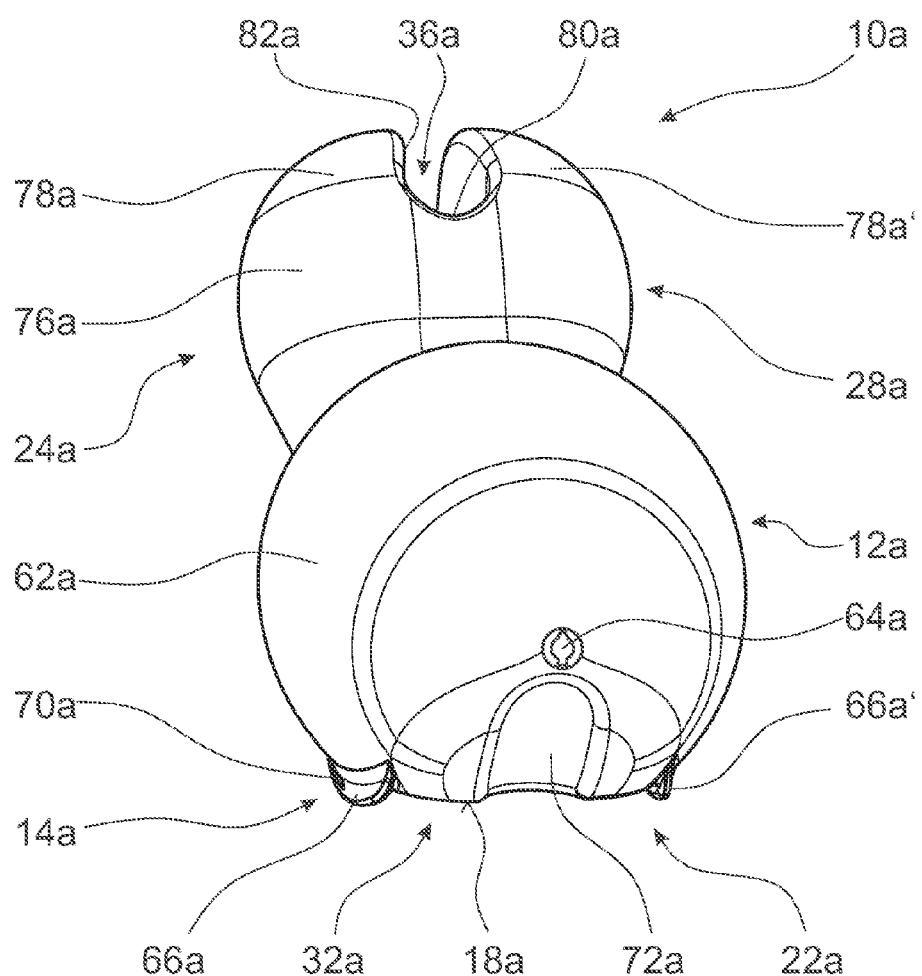
Figure 6:
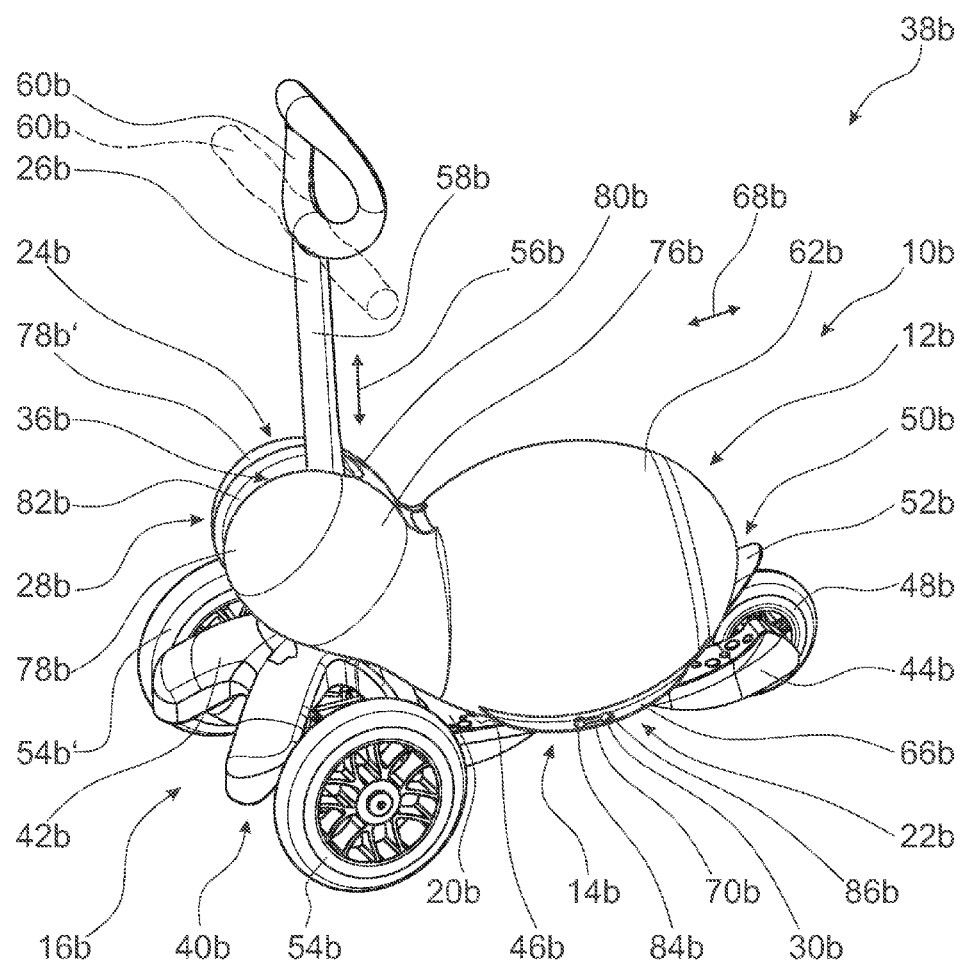
Figure 7:
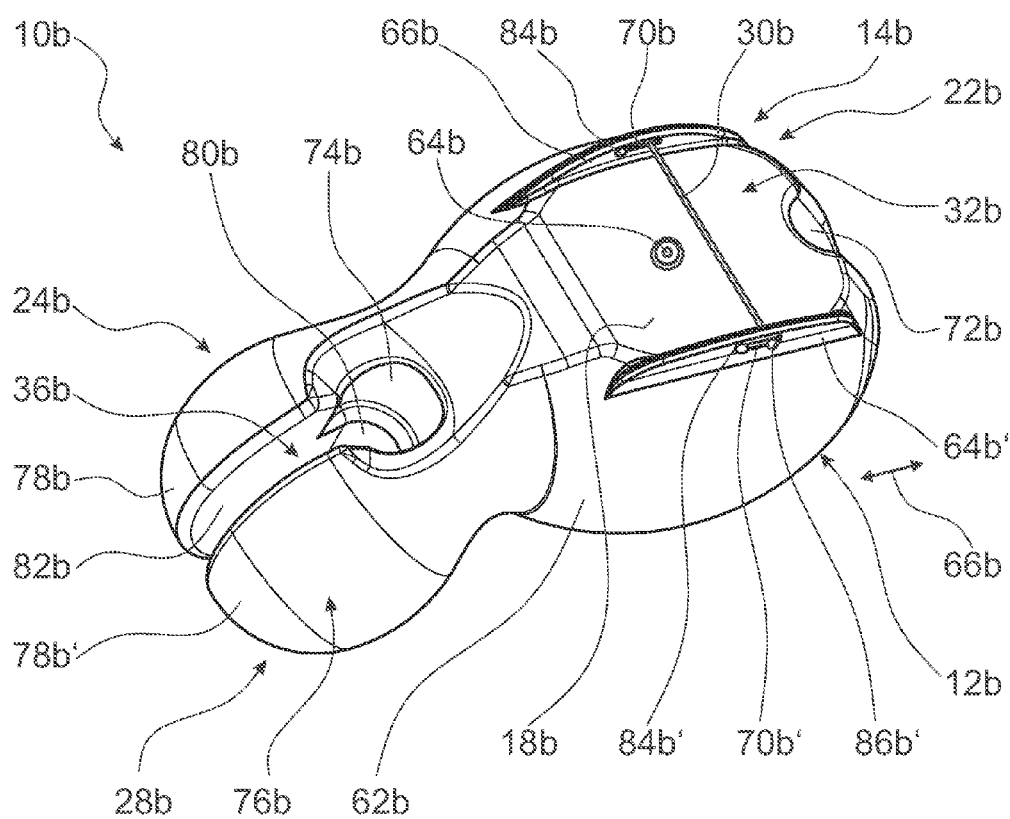
Figure 8:
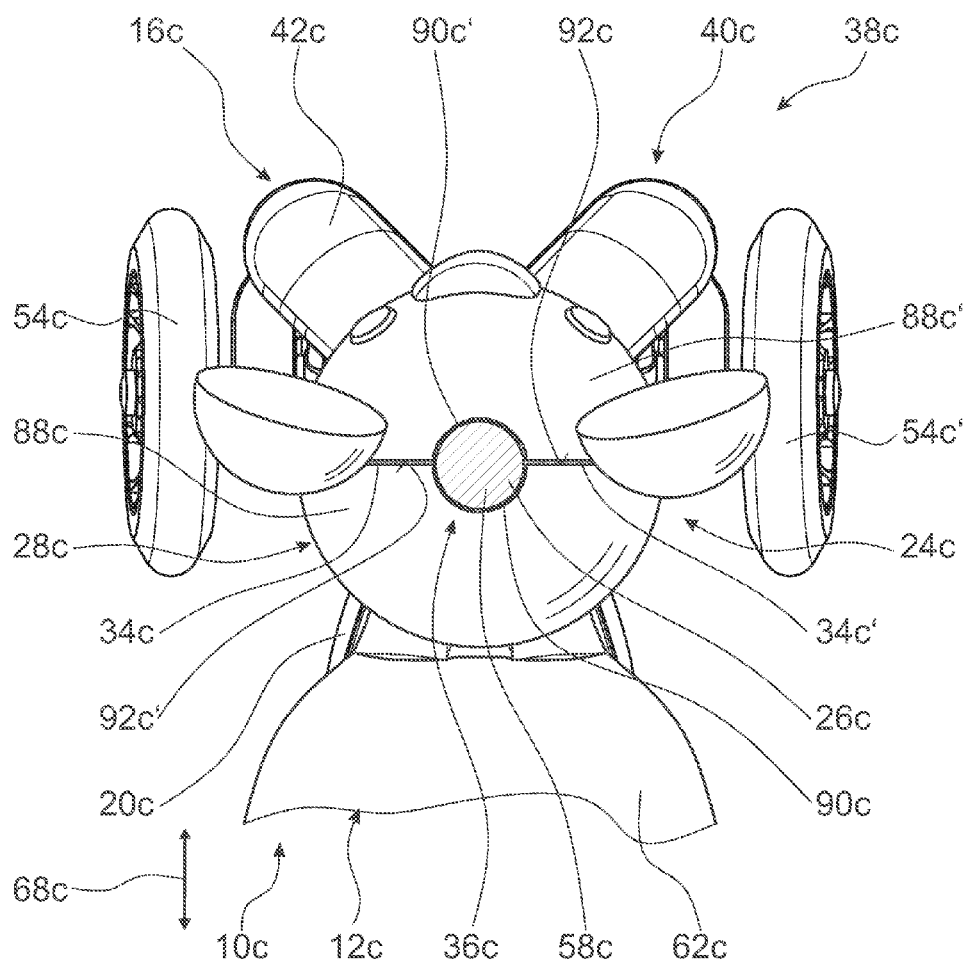
Figure 9:
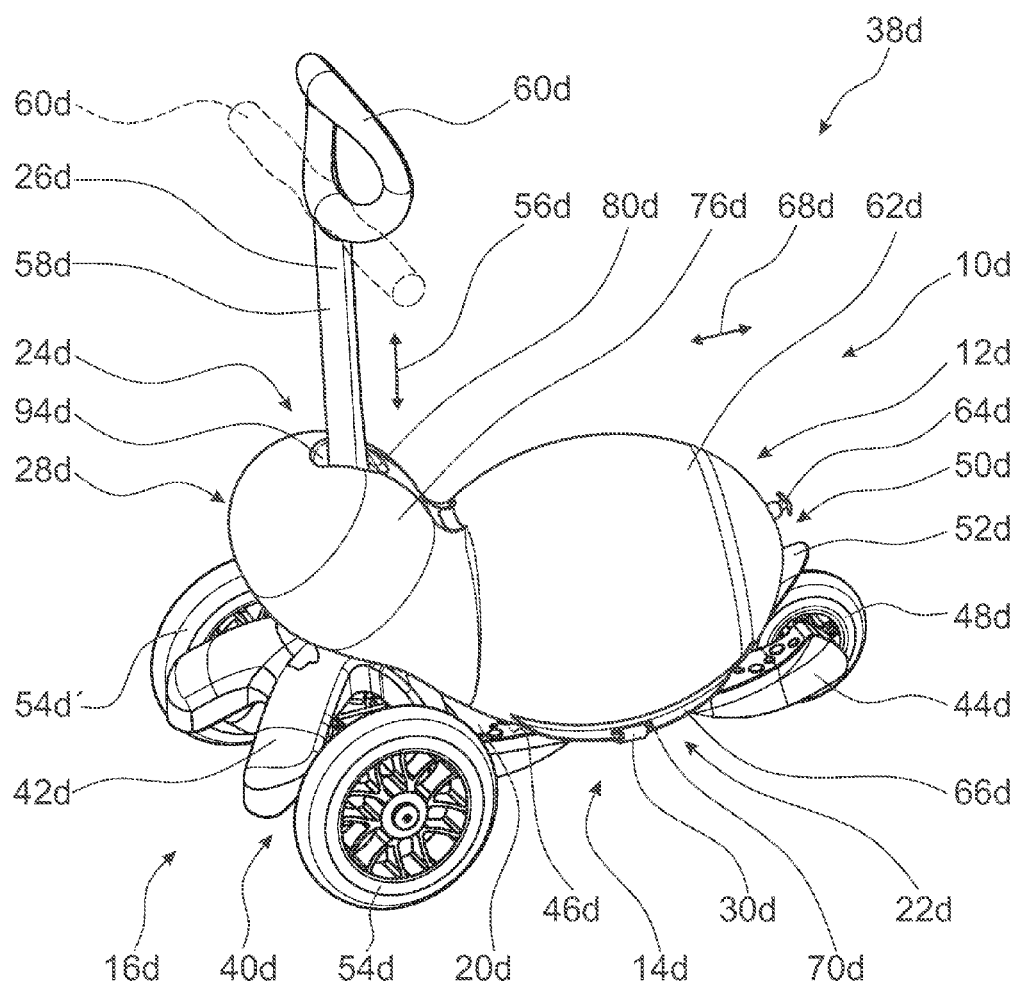
Figure 10:
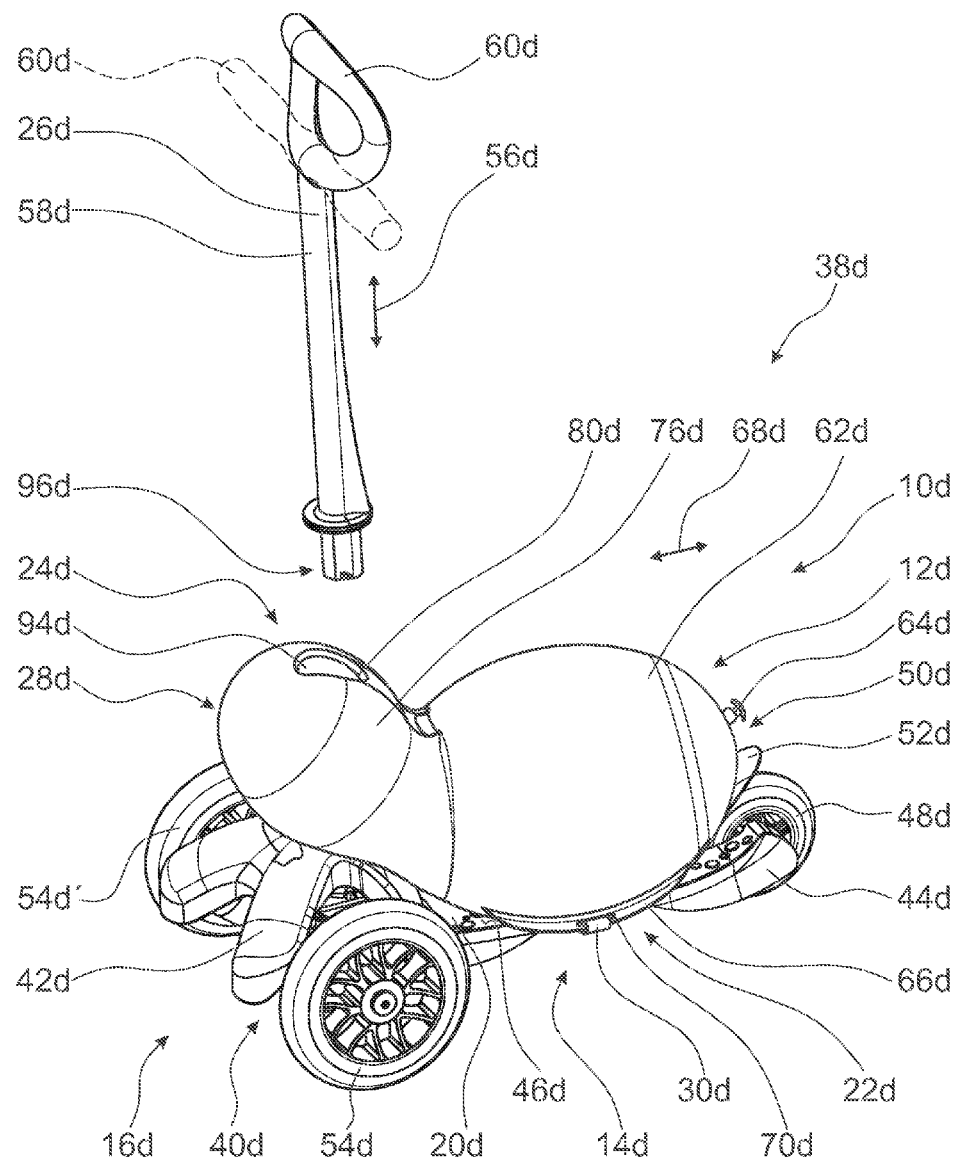
Figure 11:
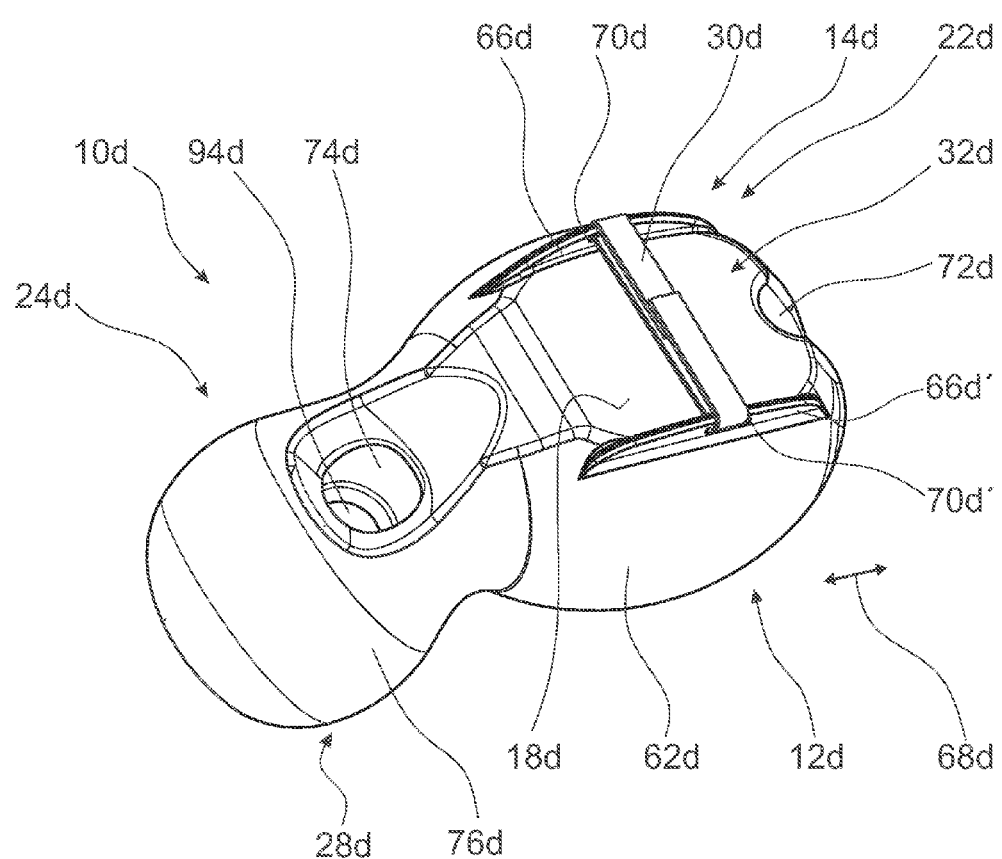

It is shown in:

FIG. 1 a scooter seat device according to the invention, with a seat base body, with a first fastening unit comprising a fastening means and with a second fastening unit, and a scooter, in a schematic presentation, FIG. 2 the scooter seat device according to the invention, without the fastening means, in an alternative, lateral schematic presentation, FIG. 3 the scooter seat device according to the invention, in a further alternative schematic presentation from above, FIG. 4 the scooter seat device according to the invention, with the fastening means, in a further alternative schematic presentation from below, FIG. 5 the scooter seat device according to the invention, without the fastening means, in a further alternative schematic presentation from the rear, FIG. 6 an alternative scooter seat device according to the invention, with a seat base body, with a first fastening unit comprising a fastening means and with an alternative second fastening unit, and a scooter, in a schematic presentation, FIG. 7 the alternative scooter seat device according to the invention, in an alternative schematic presentation from below, FIG. 8 a partial section of a further alternative scooter seat device according to the invention, with a seat base body, with a first fastening unit and with an alternative second fastening unit comprising two fastening means, and a scooter, in a schematic presentation, FIG. 9 a further alternative scooter seat device according to the invention, with a seat base body, with a first fastening unit comprising a fastening means and with a second fastening unit, and a scooter, in a schematic presentation, FIG. 10 the further alternative scooter seat device according to the invention and the scooter in a state during mounting in a schematic presentation, and FIG. 11 the further alternative scooter seat device according to the invention and the scooter in a schematic presentation from below.

DESCRIPTION OF THE EXEMPLARY EMBODIMENTS

FIG. 1 shows a scooter seat device 10a according to the invention for a scooter 16a. The scooter 16a and the scooter seat device 10a implement a system 38a. The scooter 16a is implemented by a kick scooter. The scooter 16a is implemented by a children's kick scooter. The scooter 16a is implemented by a kickboard. The scooter 16a comprises a base body 40a and a steering rod 26a. The base body 40a comprises a footboard 20a, a front axle carrier 42a, a rear axle carrier 44a and a receiving region (not shown in detail) for receiving the steering rod 26a. The footboard 20a has a bi-convex basic shape. Furthermore, the footboard 20a comprises a deck 46a, which is in an intended standing of the scooter 16a situated on a side of the footboard 20a that faces away from a surface the scooter 16a is standing on. The front axle carrier 42a and the rear axle carrier 44a respectively abut the footboard 20a at opposite ends. The rear axle carrier 44a receives via an axle (not shown in detail) a rear roll 48a of the scooter 16a in such a way that it is rotatable. Furthermore, a brake device 50a of the scooter 16a is arranged at the rear axle carrier 44a. The rear roll 48a can be braked via the brake device 50a. The brake device 50a comprises a spring-loaded element 52a, which partially projects over the rear roll 48a. The brake device 50a can be activated via pressure, e.g. by a foot of an operator, onto the spring-loaded element 52a. The front axle carrier 42a comprises a steering mechanism (not shown in detail), to which two front rolls 54a, 54a' of the scooter 16a are fastened rotatably. Via the steering mechanism that is not shown in detail, the front rolls 54a, 54a' can be tilted with respect to the base body 40a of the scooter 16a. A steering of the scooter 16a is thus effected by a weight displacement of an operator. Due to steering effected by body input via weight displacement, motor skills and the sense of balance can be trained, in particular of children. Principally, however, a steering mechanism with a rotatable steering rod for direct steering would also be conceivable. In the region of the front axle carrier 42a, furthermore the receiving region (not visible in detail) for receiving the steering rod 26a is arranged. The receiving region receives the steering rod 26a, with respect to its main extension direction 56a, such that it is parallel to a normal of a main extension plane of the footboard 20a. The steering rod 26a consists of a coupling region (not visible in detail), an elongate rod region 58s and a handle element 60a. The handle element 60a is embodied annulus-shaped. The entire scooter 16a is to a large portion made of plastic. Principally it would, however, also be conceivable, as indicated in FIG. 1 in dashed lines, that the handle element 60a is embodied rod-shaped and is implemented by two handles perpendicularly projecting from the rod region 58a. In this case the handles project in opposite directions, at an end of the rod region 58a facing away from the coupling region. The steering rod 26a is in this case implemented T-shaped.

The scooter seat device 10a is embodied by a kick scooter seat device. The scooter seat device 10a comprises a seat base body 12a. The seat base body 12a serves, inter alia, as a seat surface for an operator respectively user. Furthermore the seat base body 12a is implemented egg-shaped. Principally, however, another shaping of the seat base body 12a would also be conceivable. The seat base body 12a is embodied by a gas-filled hollow body. The seat base body 12a comprises an airtight, elastic shell 62a. The shell 62a consists to a large part of PVC, while principally another material would also be conceivable. The shell 62a has a material thickness of less than 0.25 mm. The material and the material thickness of the shell 62a correspond to the material and the material thickness of an air mattress and/or a water wing. The shell 62a delimits a hollow space of the seat base body 12a, which is filled with air. The shell 62a further comprises a valve 64a, via which air can be released out of or added to the hollow space. The valve 64a is embodied by a blow-up valve. The valve 64a is embodied by a blow-up non-return valve. For a transport the air can be removed out of the seat base body 12a and can later be pumped in for a use. The valve 64a comprises, for pumping up with air, a mouthpiece, via which an operator can pump respectively blow air into the seat base body 12a. The valve 64a corresponds to a valve of an air mattress and/or of a water wing (FIG. 2). Principally it would be conceivable that the hollow space of the seat base body 12a is divided into several chambers (not visible in detail), which are connected to each other by openings. This could, for example, allow an increase of a stability of the seat base body 12a.

Furthermore, the scooter seat device 10a comprises a first fastening unit 14a. The first fastening unit 14a is provided to releasably fixate the scooter seat device 10a to the scooter 16a. The seat base body 12a is embodied at least partially in a one-part implementation with the first fastening unit 14a. The first fastening unit 14a comprises a support surface 18a. The support surface 18a is, in a mounted state of the scooter seat device 10a on the scooter 16a, provided to support the seat base body 12a against the footboard 20a of the scooter 16a. The support surface 18a of the first fastening unit 14a is embodied in a one-part implementation with the seat base body 12a. The support surface 18a implements an underside of the seat base body 12a. The support surface 18a lies in a mounted state directly upon the deck 46a of the footboard 20a (FIGS. 1, 4).

Furthermore the first fastening unit 14a comprises a receiving element 22a. The receiving element 22a is, in a mounted state of the scooter seat device 10a on the scooter 16a, provided to partially engage around the footboard 20a of the scooter 16a. The receiving element 22a consists of two webs 66a, 66a', which run parallel to each other. The webs 66a, 66a' extend with their main extension direction parallel to a main extension direction 68a of the scooter seat device 10a. The webs 66a, 66a' are made of a hard plastic and are glued to the seat base body 12a. The webs 66a, 66a' are, with respect to the main extension direction 68a of the scooter seat device 10a, arranged on opposite sides of the support surface 18a. The webs 66a, 66a' delimit the support surface 18a in a direction perpendicular to the main extension direction 68a of the scooter seat device 10a and parallel to a main extension direction of the support surface 18a. In this way the support surface 18a can be prevented from slipping off the deck 46a of the footboard 20a of the scooter 16a. The webs 66a, 66a' each comprise a pass-through opening 70a, 70a'. The pass-through openings 70a, 70a' respectively extend in a direction perpendicular to the main extension direction 68a of the scooter seat device 10a and parallel to a main extension direction of the support surface 18a through the webs 66a, 66a'. Furthermore the pass-through openings 70a, 70a' viewed perpendicularly to the main extension direction 68a of the scooter seat device 10a and parallel to a main extension plane of the support surface 18a, are introduced into the webs 66a, 66a' approximately centrally. The pass-through openings 70a, 70a' are moreover implemented by elongate recesses. A long side of the pass-through openings 70a, 70a' herein extends parallel to a main extension direction of the webs 66a, 66a'. The two webs 66a, 66a' and the support surface 18a of the first fastening unit 14a form a receiving region 32a for receiving the footboard 20a of the scooter 16a. The footboard 20a is, in a mounted state of the scooter seat device 10a on the scooter 16a, received in the receiving region 32a of the receiving element 22a of the first fastening unit 14a (FIGS. 1, 4).

On an underside of the seat base body 12a, if viewed along the main extension direction 68a of the scooter seat device 10a, the support surface 18a is directly abutted by a rear receptacle 72a. In a mounted state, the rear receptacle 72a partially engages over the brake device 50a of the scooter 16a. Furthermore the rear receptacle 72a is embodied by a hollow partially having a negative shape of the brake device 50a. During operation the seat base body 12a can thus be deformed by an operator, e.g. by weight displacement, in such a way that the rear receptacle 72a exerts a pressure on the brake device 50a, thus activating said brake device 50a for the purpose of achieving a brake effect (FIGS. 4, 5).

On a side of the support surface 18a opposite the rear receptacle 72a, on the underside of the seat base body 12a the support surface 18a is directly abutted by a front receptacle 74a. In a mounted state, the front receptacle 74a engages over the receiving region (not visible in detail) of the base body 40a of the scooter 16a. The front receptacle 74a is embodied by a hollow partially having a negative shape of the (invisible) receiving region and of a further part of the base body 40a of the scooter 16a. Furthermore, the front receptacle 74a and the rear receptacle 72a further implement respectively one part of the seat base body 12a (FIG. 4).

The valve 64a of the shell 62a of the seat base body 12a, viewed in an orientation of the scooter seat device 10a intended for operation, is arranged above the rear receptacle 72a of the scooter seat device 10a. The valve 64a is arranged on a side of the receptacle 72a that faces away from the support surface 72a. This allows, in particular, creating a pleasant design. Preferably, for example, the stylized indication of an exhaust can thus be created. Principally, however, another arrangement of the valve 64a would also be conceivable.

The scooter seat device 10a further comprises a second fastening unit 24a. The second fastening unit 24a is embodied partially globe-shaped, while principally another shaping would also be conceivable. The second fastening unit 24a can be releasably connected to the steering rod 26a of the scooter 16a. The seat base body 12a is embodied in a one-part implementation with the second fastening unit 24a. The seat base body 12a and the fastening unit 24a are manufactured in one piece. The second fastening unit 24a is also embodied as a gas-filled hollow body. The second fastening unit 24a comprises an airtight, elastic shell 76a. The shell 76a is to a large portion made of PVC, while principally another material would also be conceivable. The shell 76a is connected to the shell 62a of the seat base body 12a in a one-part implementation. The shell 76a of the second fastening unit 24a delimits an air-filled hollow space of the second fastening unit 24a. The hollow space of the second fastening unit 24a is connected to the hollow space of the seat base body 12a in a one-part implementation. The fastening unit 24a and the seat base body 12a form a shared hollow space. Principally, however, it would also be conceivable that between the hollow spaces of the fastening unit 24a and of the seat base body 24a an elastic wall is arranged (not visible in detail), which separates the hollow spaces from each other in an airtight fashion. In this case it would further be conceivable that the shell 76a of the second fastening unit 24a comprises a second valve, via which air can be released out of or added to the hollow space.

Furthermore, the second fastening unit 24a comprises a receiving element 28a. The receiving element 28a is, in a mounted state of the scooter seat device 10a on the scooter 16a, provided to partially engage around the steering rod 26a of the scooter 16a. The receiving element 28a is, in a mounted state of the scooter seat device 10a on the scooter 16a, provided to partially engage around the rod region 58a of the steering rod 26a of the scooter 16a. The receiving element 28a, if viewed along the main extension direction 68a of the scooter seat device 10a, is divided up in a direction from the seat base body 12a towards the second fastening unit 24a into two partial elements 78a, 78a'. The receiving element 28a is, viewed in a mounted state, divided up towards the steering rod 26a, creating a receiving region 36a. The receiving region 36a serves to receive the rod region 58a of the steering rod 26a. The receiving region 36a is embodied by a wide gap extending perpendicularly to the main extension direction 68a of the scooter seat device 10a and delimited by the partial elements 78a, 78a' of the receiving element 28a. The receiving region 36a is implemented by a basic receiving region 80a and an insert region 82a. The basic receiving region 80a is embodied cylindrical, a cylinder axis extending perpendicularly to the main extension direction 68a of the scooter seat device 10a. The basic receiving region 80a is opened at both ends and towards the insert region 82a. The basic receiving region 80a serves for receiving the rod region 58a of the steering rod 26a of the scooter 16a in an end-assembly state. A cross section of the basic receiving region 80a approximately corresponds to a cross section of the rod region 58a of the steering rod 26a. The insert region 82a, viewed along the main extension direction 68a of the scooter seat device 10a, directly abuts the basic receiving region 80a in a direction from the seat base body 12a towards the second fastening unit 24a. Furthermore the insert region 82a completely opens the basic receiving region 80a in the direction from the seat base body 12a towards the second fastening unit 24a. Via the insert region 82a, the rod region 58a of the steering rod 26a can be transferred into the basic receiving region 80a in an end-assembly state. The insert region 82a is narrower with respect to the basic receiving region 80a. Consequentially, the partial elements 78a, 78a' of the receiving element 28a have to be elastically deflected outwards for assembly. Thus an unintended release of the rod region 58a of the steering rod 26a out of the basic receiving region 80a can be prevented (FIG. 3).

The first fastening unit 14a further comprises a fastening means 30a. The fastening means 30a is in a mounted state provided to releasably fixate the footboard 20a of the scooter 16a in the receiving region 32a of the receiving element 22a. The fastening means 30a is embodied by a hook-and-loop fastener. The fastening means 30a is embodied by a hook-and-loop fastener tape. The fastening means 30a is guided through the pass-through openings 70a, 70a' of the webs 66a, 66a' and is closed via a hook-and-loop connection. The fastening means 30a implements in a closed state of the hook-and-loop connection a tape that is closed in itself. For mounting and fixating the scooter seat device 10a on the scooter 16a, the receiving element 22a of the first fastening unit 14a is set upon the footboard 20a and the receiving element 28a of the second fastening unit 24a is slid onto the rod region 58a of the steering rod 26a. Then the fastening means 30a can be guided through the pass-through openings 70a, 70a' for fixation and can be closed underneath the footboard 20a (FIGS. 1, 4).

The first fastening unit 14a and the second fastening unit 24a can each be connected to and separated from the scooter 16a without a tool. Consequentially, the scooter seat device 10a can be mounted to and demounted from the scooter 16a without tools or special wrenches. A mounting can in particular also be effected by a child, without the parents' help.

In FIGS. 6 to 11 three further exemplary embodiments of the invention are shown. The following descriptions are substantially limited to the differences between the exemplary embodiments, wherein the description of the other exemplary embodiments, in particular of FIGS. 1 to 5, may be referred to as regards structural components, features and functions that remain the same. For distinguishing between the exemplary embodiments, the letter a in the reference numerals of the exemplary embodiment in FIGS. 1 to 5 has been replaced by the letters b to d in the reference numerals of the exemplary embodiments in FIGS. 6 to 11. Regarding structural components with identical denominations, in particular structural components with the same reference numerals, principally the drawings and/or the description of the other exemplary embodiments, in particular of FIGS. 1 to 5, may be referred to.

FIG. 6 shows an alternative scooter seat device 10b according to the invention for a scooter 16b. The scooter 16b and the scooter seat device 10b implement a system 38b.

The scooter seat device 10b is implemented by a kick scooter seat device. The scooter seat device 10b comprises a seat base body 12b. The seat base body 12b is implemented by a gas-filled hollow body. The seat base body 12b comprises an airtight, elastic shell 62b. Furthermore the seat base body 12b is manufactured in a rotation molding process. Principally, however, other methods would also be conceivable, e.g. blow-molding methods. The shell 62b is implemented to a large part of PVC, while principally another material would also be conceivable. The shell 62b has a material thickness between 0.5 mm and 3 mm. The material as well as the material thickness of the shell 62b correspond to the material and the material thickness of an exercise ball. The shell 62b delimits an air-filled hollow space of the seat base body 12b. Further the shell 62b comprises a valve 64b, via which air can be released out of or added to the hollow space. The valve 64b is embodied as a snap-in valve. The valve 64b consists of an opening and a stopper that closes the opening. For transport purposes the air can be removed out of the seat base body 12b and can later be pumped in again for usage. For pumping up the stopper of the valve 64b is removed and air can be pumped into the seat base body 12b by means of a pump. After that the stopper is put back into the opening of the valve 64b and the valve 64b is closed. The valve 64b corresponds to a valve of a ball, in particular of an exercise ball (FIG. 7).

The scooter seat device 10b further comprises a first fastening unit 14b. The fastening unit 14b is provided to releasably fasten the scooter seat device 10b to the scooter 16b. The first fastening unit 14b is embodied partially in a one-part implementation with a seat base body 12b of the scooter seat device 10b. The first fastening unit 14b comprises a support surface 18b. Furthermore the first fastening unit 14b comprises a receiving element 22b. The receiving element 22b is provided, in a mounted state of the scooter seat device 10b on the scooter 16b, to partially engage around a footboard 20b of the scooter 16b. The receiving element 22b consists of two webs 66b, 66b', which extend parallel to each other. The webs 66b, 66b' are embodied in a one-part implementation with the seat base body 12b. The seat base body 12b and the webs 66b, 66b' are manufactured from one casting. The webs 66b, 66b' each comprise a pass-through opening 70b, 70b'. The pass-through openings 70b, 70b' respectively extend in a direction perpendicularly to a main extension direction 68b of the scooter seat device 10b and parallel to a main extension plane of the support surface 18b through the webs 66b, 66b'. Furthermore the pass-through openings 70b, 70b', respectively viewed perpendicularly to the main extension direction 68b of the scooter seat device 10b and parallel to a main extension plane of the support surface 18b, are introduced approximately centrally in the webs 66b, 66b'. Furthermore the pass-through openings 70b, 70b' are implemented by elongate recesses. A long side of the pass-through openings 70b, 70b' herein extends parallel to a main extension direction of the webs 66b, 66b'. The pass-through openings 70b, 70b' respectively comprise, at an end, a broadened region 84b, 84b'. The broadened regions 84b, 84b' respectively have a partially circle-shaped cross section (FIG. 7).

The valve 64b of the shell 62b of the seat base body 12b is arranged in a region of the support surface 18b. The valve 64b is arranged in the support surface 18b. It can thus be achieved that during operation the valve 64b abuts a deck 46b of the footboard 20b of the scooter 16b. This allows preventing the stopper of the valve 64b from jumping out. In particular in case of a load due to an operator, the stopper of the valve 64b is fixedly held in the opening of the valve 64b. Principally, another arrangement of the valve 64b would also be conceivable.

Furthermore the first fastening unit 14b comprises a fastening means 30b. The fastening means 30b is in a mounted state provided to releasably fixate the footboard 20b of the scooter 16b in a receiving region 32b of the receiving element 22b. The fastening means 30b is implemented by a rubber tape. The fastening means 30b is implemented by a rubber tape with fixation elements 86b, 86b'. The fixation elements 86b, 86b' are respectively arranged at both ends of the rubber tape. The fixation elements 86b, 86b' are respectively embodied as enlarged globes, which have a cross section that is enlarged with respect to the remaining part of the rubber tape. The fastening means 30b is embodied in one piece.

Furthermore, the fastening means 30b is respectively held in the pass-through openings 70b, 70b' of the webs 66b, 66b' by the fixation elements 86b, 86b'. The fixation elements 86b, 86b' are guided through the pass-through openings 70b, 70b' in the broadened regions 84b, 84b' and are held by displacement into a region that differs from the broadened region 84b, 84b'. For mounting and fixating the scooter seat device 10b on the scooter 16b, the receiving element 22b of the first fastening unit 14b is set upon the footboard 20b and the receiving element 28b of the second fastening unit 24b is slid onto the rod region 58b of the steering rod 26b. After this, the fastening means 30b can be guided through the broadened regions 84b, 84b of the pass-through openings 70b, 70b' together with the fixation elements 86b, 86b', for the purpose of a fixation. In a following step the fixation elements 86b, 86b' are shifted into regions that differ from the broadened regions 84b, 84b', where they do not fit through the pass-through openings 70b, 70b' and are thus held there (FIGS. 6, 7).

FIG. 8 shows a partial section of a further alternative scooter seat device 10c according to the invention, for a scooter 16c. The scooter 16c is shown partially in a section view. The scooter 16c and the scooter seat device 10c form a system 38c. The scooter seat device 10c comprises a seat base body 12c, a first fastening unit 14c and a second fastening unit 24c.

The second fastening unit 24c is embodied partially globe-shaped, while principally another shaping would also be conceivable. The second fastening unit 24c is releasably connectable to the steering rod 26c of the scooter 16c. The seat base body 12c is embodied in a one-part implementation with the second fastening unit 24c. The second fastening unit 24c is glued to the seat base body 12c. The second fastening unit 24c is further implemented by a solid body of foamed polystyrene. The second fastening unit 24c partially has the form of an animal head. Principally, however, other shapings are also conceivable. The second fastening unit 24c allows, in particular due to its implementation according to the invention, a variety of shapings allowing a pleasant individual design.

Moreover the second fastening unit 24c comprises a receiving element 28c. The receiving element 28c is implemented by two hemispheres 88c, 88c'. The hemispheres 88c, 88c' each comprise a half-cylinder-shaped recess 90c, 90c'. The recesses 90c, 90c' are respectively introduced in planar circular areas 92, 92' of the respective hemisphere 88c, 88c'. The recesses 90c, 90c' respectively extend through a center and across an entire extension of the planar circular areas 92c, 92c' of the respective hemisphere 88c, 88c'. In a state when the hemispheres 88c, 88c' are connected over the circular areas 92c, 92c', the two half-cylinder-shaped recesses 90c, 90c' form a cylindrical recess. The two half-cylinder-shaped recesses 90c, 90c' further respectively form a receiving region 36c. The receiving region 36c serves for receiving a rod region 58c of a steering rod 26c of the scooter 16c.

Furthermore the second fastening unit 24c comprises two fastening means 34c, 34c'. The fastening means 34c, 34c' are in a mounted state of the scooter seat device 10c on the scooter 16c provided to releasably fixate the steering rod 26c of the scooter 16c in the receiving region 36c of the receiving element 28c. The fastening means 34c, 34c' are respectively embodied as a hook-and-loop fastener. The fastening means 34c, 34c' respectively consist of two hook-and-loop fastener sides. The fastening means 34c, 34c' are respectively arranged on opposite sides of the receiving region 36c, at the planar circular areas 92c, 92c' of the hemispheres 88c, 88c'. The hook-and-loop fastener sides of the fastening means 34c, 34c' are respectively arranged on opposite regions of opposite circular areas 92c, 92c'. Consequentially respectively two hook-and-loop fastener sides of different fastening means 34c, 34c' are allocated to each hemisphere 88c, 88c'. For mounting and fixating the scooter seat device 10c on the scooter 16c, the receiving element 22c of the first fastening unit 24c is set upon the footboard 20c, and the first hemisphere 88c of the receiving element 28c of the second fastening unit 24c is shifted with its first recess 90c against the rod region 58c of the steering rod 26c of the scooter 16c. After this, the second hemisphere 88c' of the receiving element 28c of the second fastening unit 24c can be connected to the first hemisphere 88c via the fastening means 34c, 34c'. In this the rod region 58c of the steering rod 26c of the scooter 16c is enclosed in the receiving region 36c between the two hemispheres 88c, 88c'.

FIG. 9 shows a further alternative scooter seat device 10d according to the invention, for a scooter 16d. The scooter 16d and the scooter seat device 10d implement a system 38d. The scooter 16d is embodied as a kick scooter. The scooter 16d is embodied as a children's kick scooter. The scooter 16d is embodied as a kickboard. The scooter 16d comprises a base body 40d and a steering rod 26d. The steering rod 26d is implemented in such a way that it is releasable from the base body 40d. The steering rod 26d is implemented in such a way that it is releasable from the base body 40d without a tool.

The scooter seat device 10d is implemented by a kick scooter seat device. The scooter seat device 10d comprises a seat base body 12d. Furthermore the scooter seat device 10d comprises a first fastening unit 14d. The first fastening unit 14d is provided for releasably fastening the scooter seat device to the scooter 16d. The seat base body 12d is embodied partially in a one-part implementation with the first fastening unit 14d (FIG. 11).

The scooter seat device 10d further comprises a second fastening unit 24d. The second fastening unit 24d is embodied partially globe-shaped, while principally another shaping would also be conceivable. The second fastening unit 24d is releasably connectable to the steering rod 26d of the scooter 16d. The seat base body 12d is embodied in a one-part implementation with the second fastening unit 24d. The seat base body 12d and the fastening unit 24d are manufactured of one piece. The second fastening unit 24d is also embodied by a closed, gas-filled hollow body (FIG. 11).

Moreover the second fastening unit 24d comprises a receiving element 28d. The receiving element 28d is in a mounted state of the scooter seat device 10d on the scooter 16d provided to completely engage around the steering rod 26d of the scooter 16d. The receiving element 28d is in a mounted state of the scooter seat device 10d on the scooter 16d provided to completely engage around the rod region 58d of the steering rod 26d of the scooter 16d. The receiving element 28d of the second fastening unit 24d comprises a pass-through opening 94d, which in one plane has a contiguous, uninterrupted outer contour. The pass-through opening 94*d* comprises in a mounted state, in a plane perpendicular to a main extension direction 56*d* of the steering rod 26*d*, a contiguous, uninterrupted outer contour. The second fastening unit 24*d* is implemented, around the pass-through opening 94*d*, by a closed, gas-filled hollow body (FIGS. 9, 11).

The first fastening unit 14*d* and the second fastening unit 24*d* are respectively connectable to and releasable from the scooter 16*d* without a tool. Consequentially the scooter seat device 10*d* can be mounted to and demounted from the scooter 16*d* without a tool or special wrenches. A mounting can in particular also be carried out by child, without the parents' assistance. For fastening the second fastening unit 24*d* of the scooter seat device 10*d* to the scooter 16*d*, the steering rod 26*d* has to be separated from the base body 40*d*. Herein the steering rod 26*d* is separated from the base body 40*d* by releasing a latch mechanism 96*d*. Principally, however, another connection mechanism that is deemed expedient by the person having ordinary skill in the art is also conceivable. Principally, mechanisms are also conceivable, for which a tool is required for releasing and/or establishing the connection. After this, the scooter seat device 10*d* can be set upon the scooter 16*d* and can, if applicable, be fixated by means of the first fastening unit 14*d*. As an alternative, the scooter seat device 10*d* can also be connected to the steering rod 26*d* in a first step, by way of sliding the second fastening unit 24*d* over the pass-through opening 94*d* on the steering rod 26*d*. In a next step the steering rod 26*d* is brought towards the base body 40*d* and is then latched with the base body 40*d*. Releasing the scooter seat device 10*d* from the scooter 16*d* is afterwards only possible by separating the steering rod 26*d* from the base body 40*d* (FIG. 10).

The invention claimed is:

1. A scooter seat device, in particular kick scooter seat device, with a seat base body and with at least one first fastening unit for fastening to a scooter, which comprises at least one support surface, which in a mounted state is provided to support the seat base body at least against a footboard of the scooter, and with at least one second fastening unit, which is releasably connectable to a steering rod of the scooter, wherein the seat base body is embodied at least partially by a gas-filled hollow body and the at least one second fastening unit is embodied at least partially by a gas-filled hollow body, wherein the at least one second fastening unit comprises at least one receiving element, which is in a mounted state provided to completely engage around the steering rod of the scooter, wherein the receiving element of the at least one second fastening unit comprises a pass-through opening, which in at least one plane has a contiguous, uninterrupted outer contour, wherein the fastening unit is implemented around the pass-through opening by a closed, gas filled hallow body.

2. The scooter seat device according to claim 1, wherein the at least one first fastening unit comp at least one receiving element, which is in a mounted state provided to at least partially engage around the footboard of the scooter.

3. The scooter seat device according to claim 1, wherein the at least one second fastening unit comprises at least one receiving element, which is in a mounted state provided to at least partially engage around the steering rod of the scooter.

4. The scooter seat device at least according to claim 2, wherein the at least one first fastening unit comprises at least one first fastening means, which is in a mounted state provided to releasably fixate the footboard of the scooter in a receiving region of the at least one receiving element.

5. The scooter seat device according to claim 4, wherein the at least one fastening means is at least partially implemented by a hook-and-loop fastener and/or a rubber tape.

6. The scooter seat device at least according to claim 3, wherein the at least one second fastening unit comprises at least one fastening means, which is in a mounted state provided to releasably fixate the steering rod of the scooter in a receiving region of the at least one receiving element.

7. The scooter seat device according to claim 6, wherein the at least one fastening means is at least partially implemented by a hook-and-loop fastener.

8. The scooter seat device according to claim 1, wherein the seat base body is embodied at least partially in a one-part implementation with the at least one first fastening unit.

9. The scooter seat device according to claim 1, wherein the seat base body is embodied at least partially in a one-part implementation with the at least one second fastening unit.

10. The scooter seat device according to claim 1, wherein the at least one first fastening unit and the at least one second fastening unit can be connected to the scooter without tools and/or can be separated from the scooter without tools.

11. A system with a scooter, in particular with a kick scooter, and with a scooter seat device according to claim 1.

* * * * *